United States Patent
Chan et al.

[11] Patent Number: 5,949,861
[45] Date of Patent: *Sep. 7, 1999

[54] SYSTEM AND METHOD FOR IMPROVING PROTOCOL DELAY TOLERANCES

[75] Inventors: Christina K. Chan, Northridge; Hongsoon H. Kwon, Downey; Simon S. Lam, Agoura Hills; William A. Larson, Calabasas, all of Calif.

[73] Assignee: Northern Telecom Limited, Montreal, Canada

[*] Notice: This patent is subject to a terminal disclaimer.

[21] Appl. No.: 09/059,635

[22] Filed: Apr. 13, 1998

Related U.S. Application Data

[63] Continuation of application No. 08/666,800, Jun. 19, 1996, Pat. No. 5,790,641.

[51] Int. Cl.$^6$ .................................................. H04M 11/00
[52] U.S. Cl. ............................... 379/100.17; 379/100.06; 379/93.31; 358/434
[58] Field of Search ......................... 379/100.01, 100.06, 379/100.13–10.15, 100.17, 93.26, 93.28, 93.29, 93.31–93.35, 93.15; 358/400, 434–436, 438, 439, 442, 468

[56] References Cited

U.S. PATENT DOCUMENTS 5,790,641  8/1998  Chan et al. .................. 379/100.17

*Primary Examiner*—Wing F. Chan
*Attorney, Agent, or Firm*—Vernon E. Williams; W. Glen Johnson; John D. Crane

[57] ABSTRACT

A system and method for extending the time period at which a facsimile response signal can be received before a time-out occurs without altering the underlying transmission protocol. The disclosed system and method determines a response time before which a response signal must be received by a transmitting facsimile station in order to avoid a time-out event. Before the response time arrives, the disclosed system and method generates and transmits a delay signal to the transmitting facsimile station which does not substantively interfere with ongoing communications. Instead, the delay signal causes the transmitting facsimile station to tickle an internal time-out counter which results in an extension of the response signal delay tolerance. Delay signal frames can be transmitted repeatedly to accommodate any desired time-out period.

18 Claims, 14 Drawing Sheets

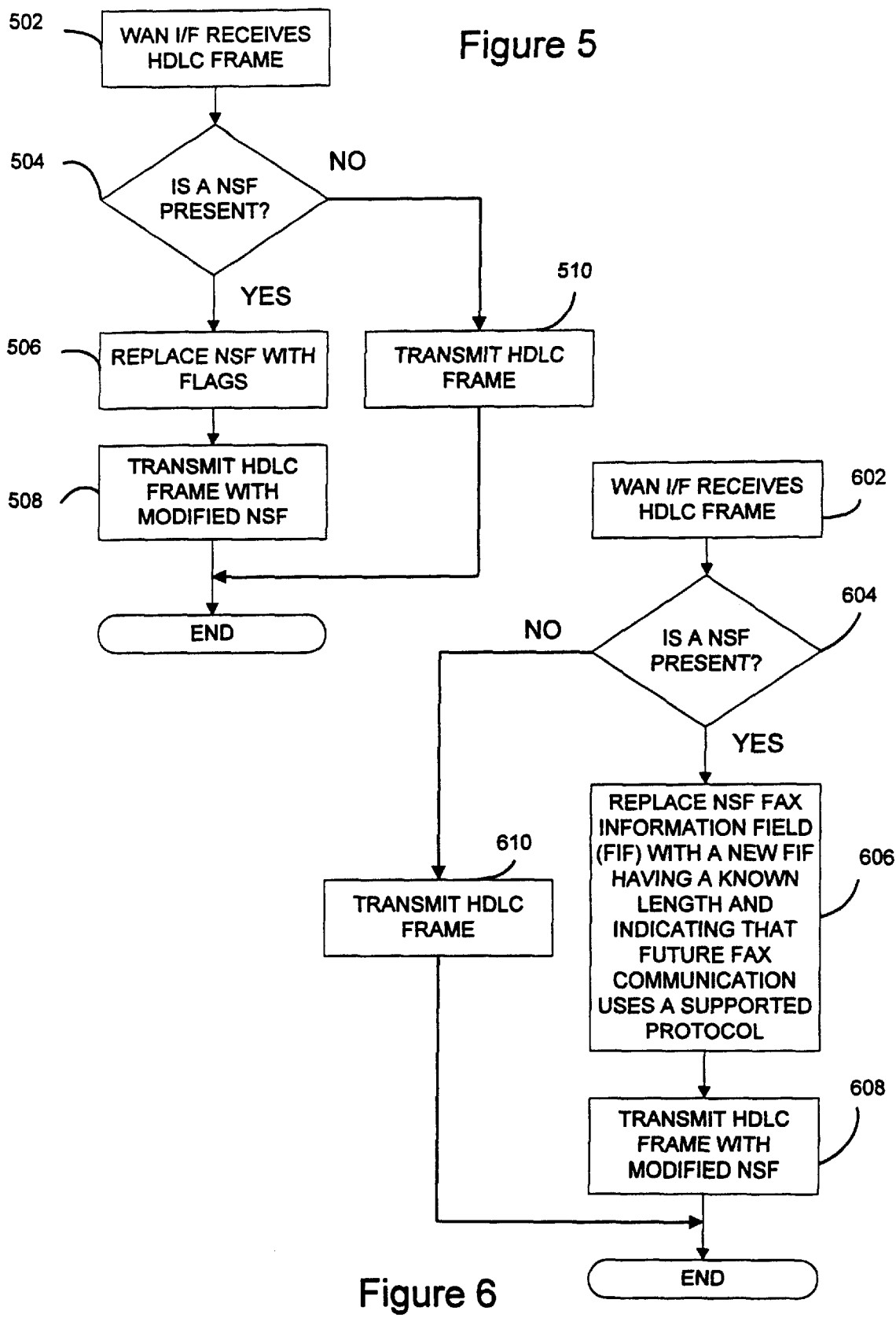

SYSTEM AND METHOD FOR IMPROVING PROTOCOL DELAY TOLERANCES

RELATED APPLICATIONS

This application is a continuation of U.S. patent application Ser. No. 08/666,800 which was filed with the U.S. Patent and Trademark Office on Jun. 19, 1996, now U.S. Pat. No. 5,790,641.

BACKGROUND OF THE INVENTION

1. Field of the Invention

The present invention relates generally to field of facsimile machine communication and more particularly to increasing delay tolerances between two facsimile machines communicating via a wide area network.

2. Description of Background Art

Conventional facsimile stations, hereafter referred to as faxes, communicate with each other using a tonal or binary coded facsimile procedure and a modulation technique during each of several communication phases of a communication session. For example, the International Telecommunications Union (ITU) recommendation T.30 identifies five transmission phases. These phases are the: (1) call set-up phase; (2) pre-message identification and facilities selection phase; (3) message transmission phase; (4) post message procedures phase; and (5) call release phase. One feature of many transmission protocols, including the ITU T.30 transmission protocol, is that after one of a particular set of command signals is transmitted by a first fax, the first fax will "time-out" if a response signal, typically generated by a second fax at a remote location relative to the first fax, is not received by the first fax within a predefined time-out period. This time-out period varies for each transmission protocol and is frequently a time range. For example, in the ITU T.30 transmission protocol the time-out period can range from 2.55 seconds to 3.45 seconds, i.e., 3.0 seconds ±0.45 seconds (15%), after the transmission of the command signal depending upon the implementation of the protocol by a particular fax. A transmission protocol can handle time-out events in a variety of ways. This may include resending the command or disconnecting the session.

Reasons for not receiving a response signal within the time-out period include (1) network congestion; (2) network transmission delays, e.g., transmission delays introduced by satellites; (3) losing the response signal; (4) network jitters, and (5) network errors. Another time-out variable when using the T.30 protocol is that the T.30 protocol does not specify a fax machine turn-around time. If the reason for not receiving the response signal is other than having a lost response signal, it is generally ineffective for the fax to retransmit the command because its response will most likely exceed the time-out period. Instead, what is needed is a system and method that extends the period for response without altering the length of the time-out period defined in the transmission protocol.

One possible solution is to alter the time-out period defined by the transmission protocols. A problem with this solution is that the transmission protocols are frequently supported and interpreted by software within each fax. Therefore, in order to modify the transmission protocols, the software within these existing faxes must be modified. Such a solution would be expensive and difficult to implement.

During the pre-message identification and facilities selection phase, the faxes perform a handshaking operation that identifies, among other items, the type of fax, the transmission speed, and the modulation technique that is to be used during the communication session. One problem that is encountered when attempting to extend the delay tolerance of the faxes is that the protocol used by the faxes can be a proprietary protocol, or an infrequently used protocol. In the aggregate, these additional protocols are expensive to support because of the required memory space necessary to interpret and implement these prototypes. In addition, since many proprietary protocols are not published, extending the response signal delay tolerances of the communication session is difficult to accomplish when the faxes are utilizing such a proprietary protocol. Similarly, during the pre-message identification and facilities selection phase, the faxes agree on a signal modulation technique, e.g., the International Consultative Committee for Telephone and Telegraph (CCITT) recommendation V.29. It is difficult to support all modulation techniques because of the memory requirements and processing requirements demanded of the system. For example, each new fax model would need to be supported since each may have its own proprietary standard and, since many fax machines are designed for communications over a full duplex public switched telephone network (PSTN), these proprietary protocols may exceed the permitted bandwidth on the WAN. Therefore, what is needed is a system and method that ensures that two faxes communicate using one of a predefined, e.g., standard, set of supported transmission protocols and ensures that the faxes use one of a predefined set of modulation techniques.

Accordingly, what is needed is a system and method for: (1) extending the time period at which a response signal can be received before a time-out occurs even when the delay exceeds the time-out period defined in the transmission without altering the length of the time-out period defined in the transmission protocols; (2) ensuring that the two faxes communicate using one of a predefined set of transmission protocols; and (3) ensuring that the two faxes communicate using one of a predefined set of signal modulation techniques.

SUMMARY OF THE INVENTION

The invention is a system and method for extending the time period at which a response signal can be received by a fax before a time-out occurs without altering the length of the time-out period defined in any transmission protocol, ensuring that the two faxes communicate using one of a predefined, e.g., standard, set of transmission protocols, and/or ensuring that the two faxes communicate using one of a predefined set of signal modulation techniques.

The present invention receives signals transmitted from a local fax and transmits these signals to a remote fax. Similarly, the present invention receives signals transmitted from the remote fax and transmits these signals to the local fax. The present invention examines the contents of the signals and can modify the signal transmitted to the local fax in order to ensure that the two faxes communicate using a transmission protocol that is supported by the present invention and to ensure that the two faxes communicate using a signal modulation technique that is supported by the present invention. In addition, the present invention determines a response time before which a response signal must be received by the local fax in order to avoid a time-out event. Before the response time arrives, the present invention generates and transmits a delay signal to the local fax. The delay signal does not substantively interfere with the communication between the local fax and the remote fax. Instead, the delay signal causes the local fax to stop an internal time-out counter which results in an extension in the response signal delay tolerance of the local fax. Delay frames can be generated and transmitted repeatedly to accommodate any desired time-out period without modifying the transmission protocol.

BRIEF DESCRIPTION OF THE DRAWINGS

FIG. 5 is a flowchart illustrating a method for modifying an NSF frame according to one embodiment of the present invention.

FIG. 6 is a flowchart illustrating a method for modifying an NSF frame according to a preferred embodiment of the present invention.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit(s) of each reference number correspond(s) to the figure in which the reference number is first used.

Figure 1:
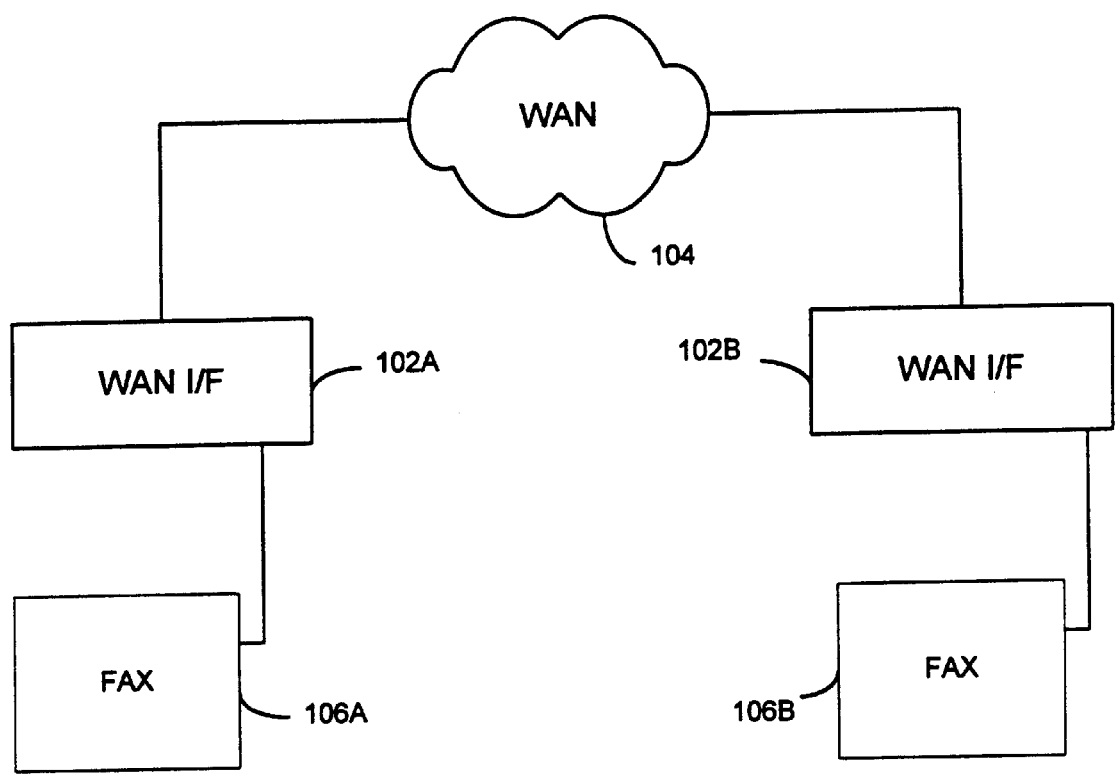
FIG. 1 is an illustration of the environment in which the present invention operates.

FIG. 1 is an illustration of the environment in which the present invention operates. FIG. 1 illustrates a local fax 106A, a remote fax 106B, a local wide area network interface (WAN I/F) 102A, a remote WAN I/F 102B, and a wide area network (WAN) 104. The present invention can be used in conjunction with a variety of WANs 104 including a general switched telephone network (GSTN), leased lines, frame relays, asynchronous transfer mode (ATM) networks, and the Internet, for example. In the preferred embodiment, the WAN is a GSTN. In alternate embodiments, other WANs can be used either alone, in combination with each other, or in combination with a conventional local area network (LAN), for example. The local fax 106A and the remote fax 106B are conventional facsimile stations, for example model Xerox 7024 commercially available from Xerox Corporation, Rochester, N.Y., and model number Panasonic KT500 commercially available from Panasonic Corporation, Secaucus, N.J.

The WAN I/F s 102 provide an interface between the WAN 104 and each of the faxes 106. In the preferred embodiment, each fax 106 is coupled to a WAN I/F 102. For ease of discussion, the present invention will be described by examining a fax communication session with the calling fax 106A initiating a connection and transmitting data to the called fax 106B. From the perspective of the calling (local) fax 106A, WAN I/F 102A is local because signals transmitted from the calling fax 106A to the WAN 104 pass through the local WAN I/F 102A. From the perspective of the calling fax 106A, WAN I/F 102B is remote because signals transmitted from the calling fax 106A to WAN I/F 102B first pass through the WAN 104. Accordingly, from the perspective of the calling fax 106A, and for identification in this application, WAN I/F 102A is the local WAN I/F 102A and WAN I/F 102B is the remote WAN I/F 102B. In alternate embodiments, only one WAN I/F is necessary to implement the present invention. In the preferred embodiment the WAN I/F 102 is a conventional WAN I/F 102 with some additional elements as set forth below. Examples of a WAN I/F 102 are a Marathon model UVM or model Sprinter V/F, that are commercially available from MICOM Communications Corp., Simi Valley, Calif. The functions performed by the WAN I/F 102 are described in greater detail below with reference to FIGS. 2–11.

Figure 2:
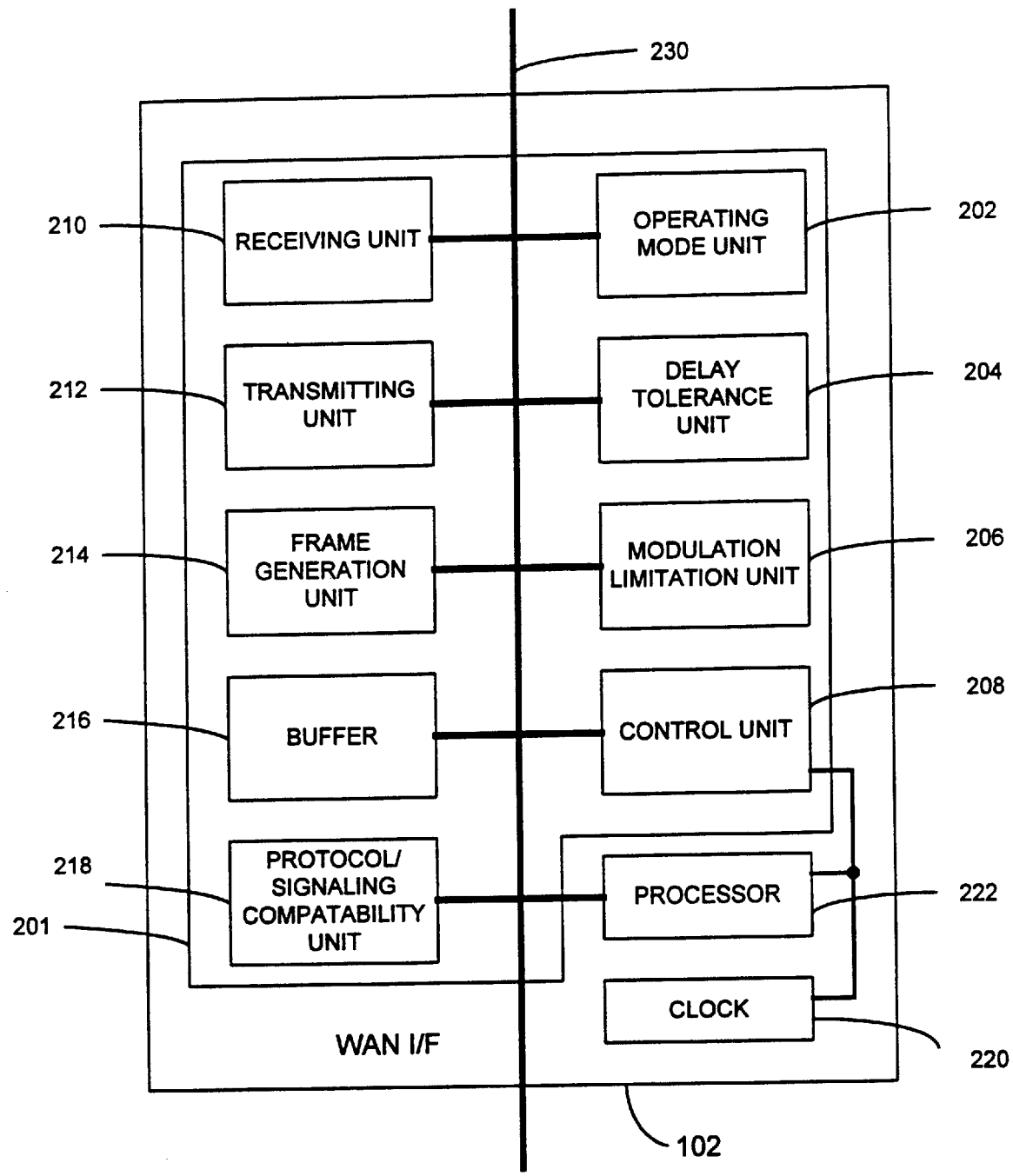
FIG. 2 is a more detailed illustration of the wide area network interface module according to the preferred embodiment of the present invention.

FIG. 2 is a more detailed illustration of the WAN I/F 102 according to the preferred embodiment of the present invention. The WAN I/F 102 includes a processor 222, a clock 220, and a memory module 201 that includes an operating mode unit 202, a delay tolerance unit 204, a modulation limitation unit 206, a control unit 208, a receiving unit 210, a transmitting unit 212, a frame generation unit 214, a data buffer 216, and a protocol/signaling compatibility unit 218. In the preferred embodiment a conventional digital signal processor is used, for example, a TMS320C51, that is commercially available from Texas Instruments, Dallas, Tx. The clock 220 is a conventional computer timing device. The memory module 201 is a conventional computer storage medium, for example Toshiba DC551664AJ-15 random access memory (RAM). The receiving unit 210 is conventional and receives signals from the data bus 230. The transmitting unit 212 is conventional and transmits signals over the data bus 230. The frame generation unit 214 is conventional and generates data frames in accordance with a determined protocol for transmitting signals through the WAN 104. The memory module 201 also includes a conventional data buffer 216. The data buffer 216 can be used for storing received signals before the signals are processed and transmitted. For example, in the preferred embodiment one use of the data buffer 216 is for jitter control. Delays in the transmission of signals over the WAN 104 can result in a variation of the propagation delay over the WAN 104. In order to accommodate such propagation delay variations, i.e., data jitter, the WAN I/F 102 temporarily stores newly received signals in the data buffer 216 and transmits the data at a constant rate to its connected fax 106, e.g., local fax 106A. The protocol/signaling compatibility unit 218 is an interpreter for all protocols supported by the WAN I/F 102, e.g., the International Telecommunications Union (ITU) recommendation T.30, and all signal modulation techniques supported by the WAN I/F 102, e.g., the International Consultative Committee for Telephone and Telegraph (CCITT) recommendation V.29. In the preferred embodiment, WAN I/Fs 102 support the ITU T.30 transmission protocol and the V.27 or V.29 signal modulation technique. It will be apparent to persons skilled in the art that alternate transmission protocols and signal modulation techniques can be used without departing from the scope of the present invention. The ITU T.30 protocol is described in *Recommendation T.30— Procedures For Document Facsimile Transmission in the General Switched Telephone Network*, ITU (revised 1992), which is incorporated by reference herein in its entirety. The control unit 208 operates in a conventional manner and coordinates the operation of functional units in the memory module 201.

Figure 3:
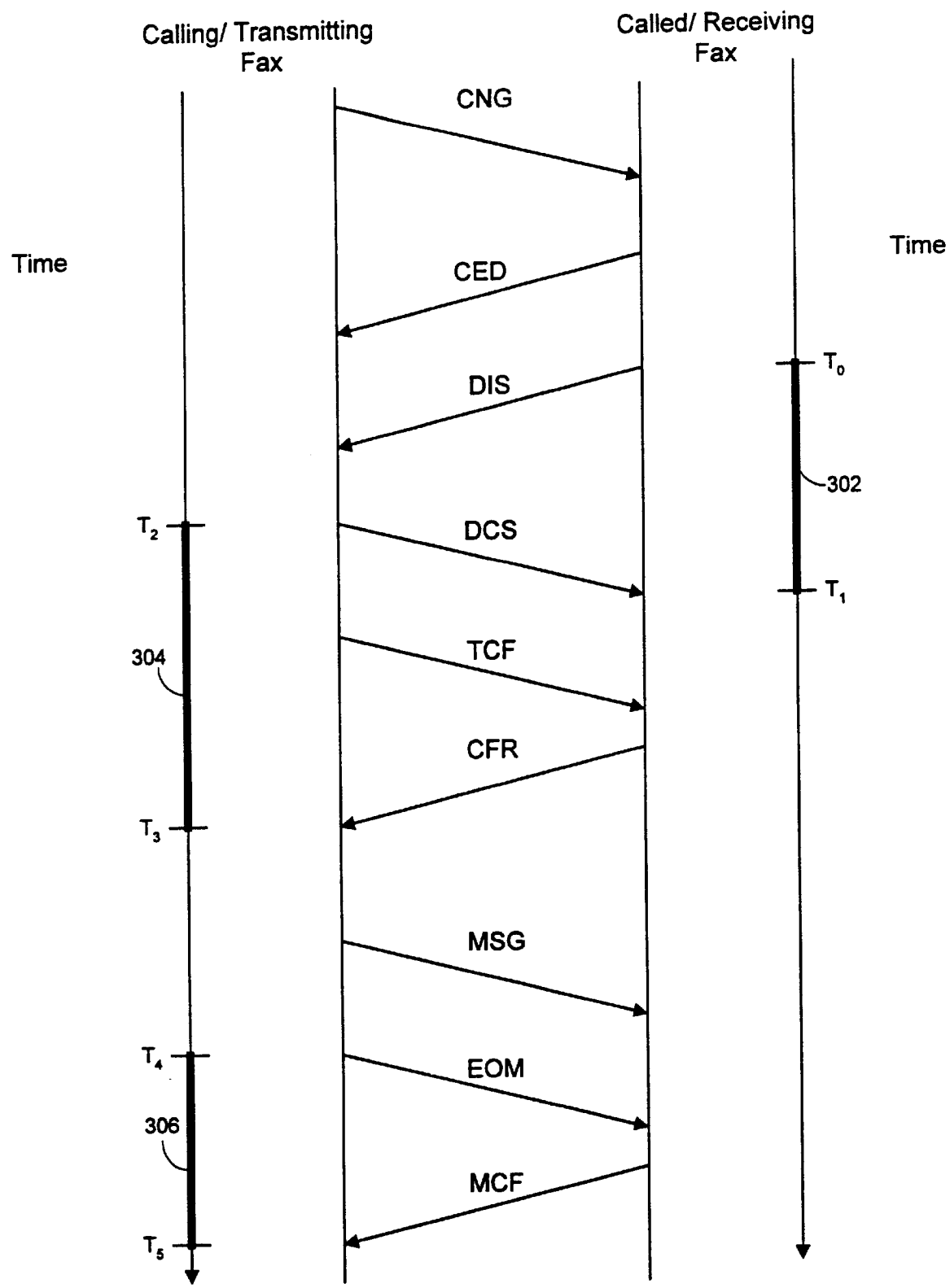
FIG. 3 is an illustration of communication signals transmitted between two facsimile stations indicating periods when a limited delay tolerance is in effect according to a preferred embodiment of the present invention.
Figure 4:
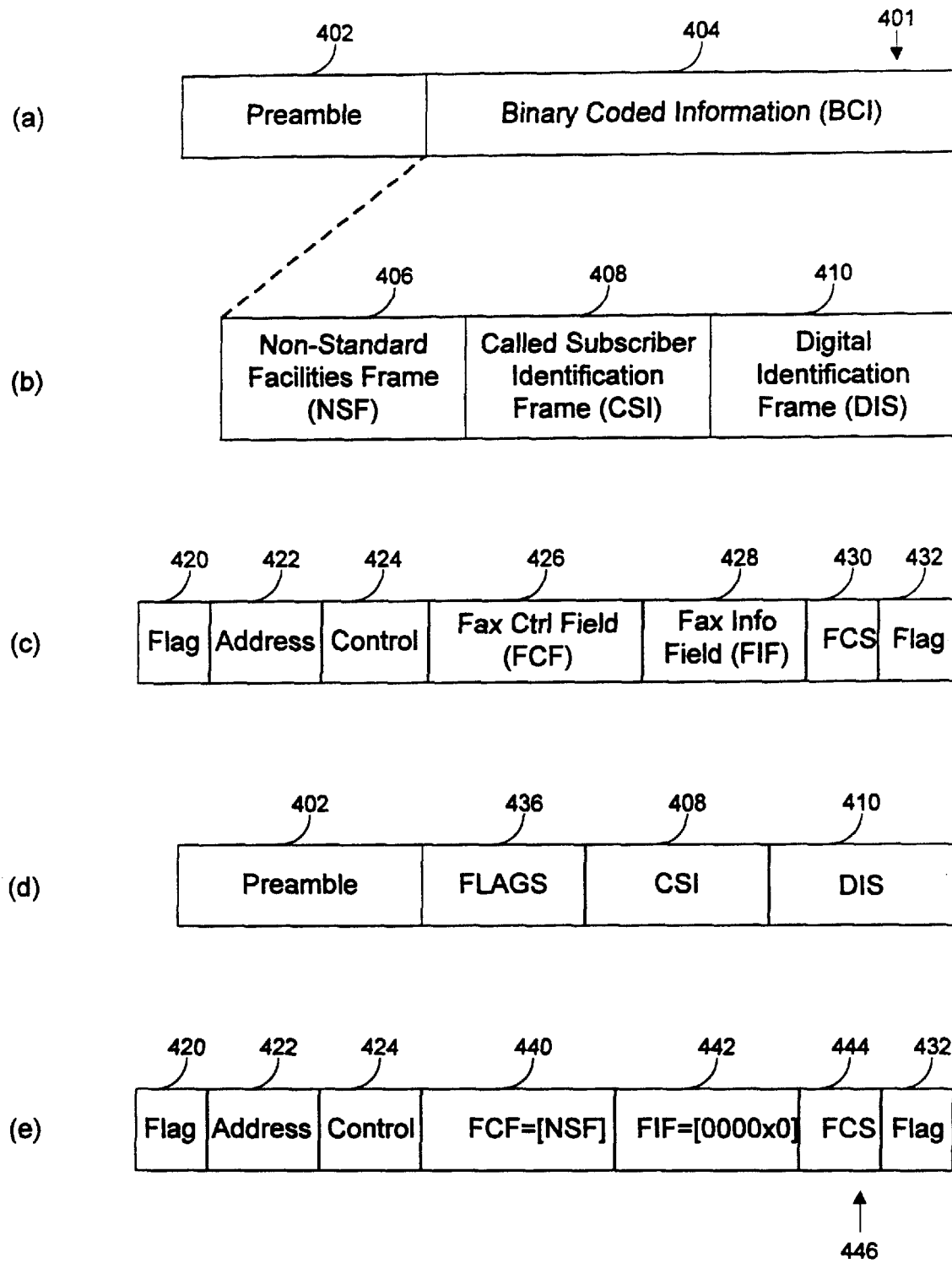
FIGS. 4(a)–4(c) illustrate an HDLC frame according to a preferred embodiment of the present invention.
FIGS. 4(d)–4(e) are examples of an NSF frame modification procedure according to the present invention.

The functions performed by the operating mode unit 202 are described in greater detail below with reference to FIGS. 3–5. The operation of and functions performed by the delay tolerance unit are described below with reference to FIGS. 6–9. The operation of and functions performed by the modulation limitation unit 206 are described in greater detail below with reference to FIGS. 10–11.

The operation of the invention is described below with reference to the T.30 transmission protocol recommendation, hereafter referred to as the T.30 protocol. FIG. 3 is an illustration of communication signals transmitted between two facsimile stations 106 using the binary coded signaling technique of the T.30 protocol indicating periods when a limited delay tolerance is in effect according to a preferred embodiment of the present invention. The T.30 protocol sets forth procedures for document fax transmission. Each document fax transmission, hereafter referred to as communication session, can be described as a series of five phases, identified as phases A–E. Phase A is the call set-up phase. In phase A a series of optional tones are transmitted from the local fax 106A to the remote fax 106B and from the remote fax 106B to the local fax 106A to establish a connection. In FIG. 3 an 1100 hertz (Hz) tone, identified as CNG, is transmitted for a duration of 0.5 seconds from the calling/local fax 106A to the called/remote fax 106B. In response, the remote fax 106B transmits a 2100 Hz signal, CED, to the local fax 106A.

Phase B is the pre-message identification and facilities selection phase. In phase B the called fax, e.g., remote fax 106B, identifies its capabilities by sending a digital identification signal (DIS) to the calling fax, e.g., local fax 106A. The local fax 106A responds by generating and transmitting a command signal, e.g., a digital identification command signal (DCS), that identifies the transmission conditions of the communication session, e.g., communication protocol and signal modulation technique. The local fax then immediately transmits a training check frame (TCF) that, when used by the remote fax, verifies training and provides an initial indication of the acceptability of the channel for the received data rate. The remote fax 106B then transmits a confirmation to receive (CFR) signal to the local fax 106A indicating that the transmission conditions are acceptable. In the T.30 protocol the CFR is a response signal for the DCS signal. If the transmission conditions are not acceptable, the remote fax 106B transmits a fail to train (FTT) signal to the local fax 106A indicating that the transmission conditions are not favorable. For example, the local fax 106A can transmit a training sequence at a lower transmission rate until a CFR is received. A more detailed description of the digital document facsimile operation is set forth below. Phase C is the message transmission phase. In phase C the document is transmitted by a series of message signals (MSG) from the local fax 106A to the remote fax 106B, in this example, using the transmission conditions agreed upon in phase B.

Phase D is the post message procedures phase. In phase D the local fax 106A transmits an end of message signal (EOM) that indicates that the end of a page of fax information has been transmitted and the remote fax 106B responds with a message confirmation signal (MCF) indicating that a complete page has been received. Additional signaling can occur in phase D, for example if the local fax 106A has multiple pages to transmit, such multiple page signals and confirmations will be transmitted by the faxes 106. Phase E is the call release phase. In phase E the connection that was established in phase A is released.

Each transmitted signal in phase A, phase B, phase D, and phase E are in the HDLC format. FIGS. 4(a)–4(c) illustrate a high-level data link control (HDLC) frame 401 according to a preferred embodiment of the present invention. A more detailed description of the HDLC frame, the HDLC protocol, and communication systems can be found in Freeman, *Practical Data Communications*, John Wiley & Sons, Inc., 1995 which is incorporated by reference herein in its entirety. FIG. 4(a) is an illustration of an HDLC frame 401. An HDLC frame 401 includes a preamble 402 and a binary coded information field (BCI) 404. In the T.30 protocol the HDLC preamble is equal to a series of flags where each flag is an eight bit value equal to "01111110", i.e., 7E hexadecimal (7Eh). In the T.30 protocol the length of the preamble is 1.0 second ±15%. The BCI 404 includes one or more frames having signaling information therein. The BCI 404 of an HDLC frame 401 can include optional frames, mandatory frames, or both. A mandatory frame is a frame that is required for the handshaking process of the transmission protocol. A mandatory frame typically defines the type of signal that is transmitted, as described below. An optional frame is a frame that is not required for the handshaking process of the transmission protocol. Therefore, an optional frame can include proprietary information, e.g., the NSF.

FIG. 4(b) is an illustration of a DIS signal, i.e., one type of HDLC frame 401, having three frames, an optional non-standard facilities frame (NSF) 406, an optional called subscriber identification frame (CSI) 408, and a mandatory digital identification frame (DIS) 410. Since the digital identification frame 410 is the only mandatory frame, the entire HDLC frame 401 is referred to as a DIS signal. Although each frame, e.g., NSF 406, CSI 408, and DIS frame 410, can vary in length, each has the same format. FIG. 4(c) is an illustration of the format for each frame in an HDLC frame 401. Each frame includes one or more flags 420, an address field 422, a control field 424, a facsimile control field (FCF) 426, a facsimile information field (FIF) 428, a frame checking sequence field (FCS) 430, and one or more flags 432. As described above, in the HDLC protocol a flag is defined as a byte having a value of 7Eh. Each frame includes one or more flags at the beginning 420 and at the end 432 of the frame. These flags are recognized by the fax 106 as denoting the beginning and end of the frame. The address field 422 identifies a specific destination station address if a multi-point WAN is used. If the WAN is the GSTN, as in the preferred embodiment, the value of the address field 422 is equal to FFh. The HDLC control field 424 is eight bits in length and provides the capability of encoding the commands and responses that are unique to the fax control procedures. The T.30 protocol defines the fourth least significant bit (LSB) of the control field 424 as identifying whether the frame is the last frame that is transmitted prior to an expected response from another station. For example, the DIS signal illustrated in FIG. 4(b) includes three frames, the NSF 406, the CSI 408, and the DIS frame

410. Each of these frames includes a control field. Only the DIS frame 410 is the final frame, therefore the fourth least significant bit of the control field 424 for the DIS frame 410 is equal to a binary one while this bit is equal to a binary zero for both the NSF 406 and the CSI 408.

A facsimile information (FI) portion can include two sub-fields, the facsimile control field (FCF) 426 and the facsimile information field (FIF) 428. The FCF 426 is the first eight bits of the FI and includes information identifying the type of information being exchanged and the position in the overall sequence. For example, the FCF 426 can identify the frame as an NSF 406, a CSI 408, a DIS 410, a CFR, or an EOM, for example. The details as to how each frame is identified is set forth in the T.30 protocol that is incorporated by reference above. The FIF 428 is an optional variable length field that includes additional information that defines the information in the frame as set forth in the T.30 protocol. The FCS 430 is a 16 bit checking sequence and is used to detect transmission errors.

When the called fax, e.g., the remote fax 106B, generates a DIS signal, the DIS signal can include information indicating that the remote fax supports a transmission protocol that is not supported by the remote WAN I/F 102B. For example, in the T.30 protocol, the remote fax can include an indication in the NSF 406 of the DIS signal that indicates that the remote fax can operate using a proprietary protocol. As described above, the number of protocols that the WAN I/F 102 can support is limited because of memory limitations and because some protocols are proprietary and are not publicly available. Therefore, other faxes do not understand the proprietary protocol. In order to properly extend the delay tolerance of the faxes, the WAN I/F 102 of the present invention must be able to support the transmission protocol utilized by the faxes 106 during the communication session. With respect to the T.30 protocol, two techniques for ensuring that the transmission protocol utilized during the communication session are supported by the WAN I/F 102 are described in FIG. 5 and FIG. 6.

As stated above, FIGS. 5 and 6 illustrate two possible techniques for implementing the operating mode selection function of the operating mode unit 202. FIG. 5 is a flowchart illustrating a method for modifying an NSF frame according to an alternate embodiment of the present invention. The receiving unit 210 of the remote WAN I/F 102B receives 502 a full or portion of a DIS signal over the data bus 230 and stores the received portion of the signal in the data buffer 216. Processor control is then passed to the operating mode unit 202 by control unit 208. After receiving 502 the DIS signal, the operating mode unit 202 determines 504 if an NSF 406 is present. The operating mode unit reads the value of the control field 424 of the first frame of the DIS signal. As described above, the value of the control field 424 identifies the type of frame. If the value of the control field identifies the frame as an NSF 406, the operating mode unit 202 replaces 506 the entire NSF 406 with flag values, e.g., 7Eh. The transmitting unit 212 then transmits 508 the HDLC frame, with the NSF replaced by flags, to the local fax 106A. If the received frame is not an NSF frame 406, the unmodified HDLC frame (DIS signal) is transmitted 510 to the local fax 106A via the WAN 104 and the local WAN I/F 102A. The local fax 106A interprets the received DIS signal using the T.30 protocol. If the NSF 406 is equal to all flag values then it will be ignored and, accordingly, the default protocol, which is supported by the remote WAN I/F 102B, will be used by the faxes 106 during the communication session. FIG. 4(*d*) illustrates the HDLC frame (DIS signal) of FIGS. 4(*a*)–4(*b*) after being modified by the present invention. The HDLC frame includes the preamble 402, a set of flags 436 equal in length to the NSF 406 that has been replaced by the set of flags 436, the CSI 408, and the DIS frame 410.

Some faxes may interpret the replacement flags 436 as part of the preamble. Since the NSF 406 is an optional frame, the entire HDLC would still have a valid format. However, if the combined duration of the preamble 402 and the replacement flags 436 exceeds the maximum permissible duration of the preamble for the local fax 106A, e.g., 1.15 seconds (1 second ±15%) then the local fax 106A will deem the received HDLC frame as invalid. To overcome this potential interpretation, a different operating mode detection and NSF modification can be used. This technique is now described with reference to FIG. 6.

FIG. 6 is a flowchart illustrating a method for modifying an NSF frame according to a preferred embodiment of the present invention. The remote WAN I/F 102B receives 602 an HDLC frame and determines 604 if an NSF 406 is present in the HDLC frame as described above with reference to FIG. 5. If an NSF frame is present in the HDLC frame, the operating mode unit 202 replaces 606 the FIF 428 with a new FIF having a value that when interpreted by the local fax 106A will ensure that either the default transmission protocol, e.g., the T.30 protocol, or another supported protocol will be used during the communications session. The transmitting unit 212 then transmits 608 the HDLC frame having the modified NSF frame 446 to the local fax 106A via the WAN 104 and the local WAN I/F 102A. If an NSF is not part of the received HDLC frame, the transmitting unit 212 transmits 610 the unmodified HDLC frame to the local fax 106A via the WAN 104 and the local WAN I/F 102A. FIG. 4(*e*) is an illustration of an example of the transmission protocol modification technique according to the preferred embodiment of the present invention. When an NSF 406 is received, as indicated by the FCF 440 being equal to a value indicating that the frame is an NSF, the operating mode unit 202 modifies the FIF 442 to 16 bits of zeros and modifies the FCS 430 accordingly. The modified NSF 446 is then transmitted to the local fax 106A, as described above. A benefit of the present invention is that an identification signal, e.g., a DIS signal, that is transmitted from a remote fax 106B, is intercepted by the remote WAN I/F 102B before reaching the local fax 106A. This enables the remote WAN I/F 102B to modify the value of the signal and ensure that the faxes 106 will not use a proprietary transmission protocol during the communication session. The present invention does not require modifications to the fax 106 or to the transmission protocol. In an alternate embodiment, the local WAN I/F 102A intercepts and modifies the NSF frame received from the remote fax 106B and transmits the new NSF frame to the local fax 106A. Another benefit of identifying the transmission protocol, and the modulation technique as described below, that is to be used during the communication session is that the time required to perform the handshaking process is reduced because the transmitting and receiving faxes agree to a transmission protocol and modulation technique using fewer signals, in general.

As described above, each transmission protocol defines a limited delay tolerance. With reference to FIG. 3, the time period 302 between the transmission $T_0$ of the DIS signal and the receipt $T_1$ of the DCS response signal must not exceed the limited delay tolerance. In the T.30 protocol, the limited delay tolerance for responding to a DIS signal is referred to as a T4 delay and is equal to 3.0 seconds ±15%, i.e., the limited delay tolerance is between 2.55 seconds and 3.45 seconds depending upon the implementation of the T.30 protocol by a particular fax 106. Similarly, the time period 304 between the transmission T₂ of the DCS command and the receipt T₃ of the CFR response must not exceed the limited delay tolerance, T4, or else the local fax 106A will time-out, as described above. Similarly, the time period 306 between the transmission T₄ of the EOM command and the receipt TS of the MCF response must not exceed the limited delay tolerance. As described above, in conventional systems, when a response signal is not received before a first time period expires, e.g., at approximately 2 seconds, where the first time period is less than the maximum time period, these conventional systems generate a sequence of flags in order to delay the maximum response tolerance up to a maximum of an additional 1–2 seconds. In contrast, the present invention enables the limited delay tolerance to be extended indefinitely without altering the transmission protocol specifications. The technique for extending the limited delay tolerance during a fax communication session according to the present invention is set forth below with reference to FIGS. 7–9.

FIGS. 7(*a*), 7(*b*), 7(*c*), and 7(*d*) are flowcharts illustrating methods for generating and transmitting a delay frame for extending a delay tolerance of a facsimile communication system according to a preferred embodiment and several alternate embodiments of the present invention. FIGS. 7(*a*), 7(*b*), 7(*c*), and 7(*d*) are now described with reference to FIGS. 8(*a*), 8(*b*), and 8(*c*). FIG. 8(*a*) is a timing diagram illustrating an example of a delay frame transmission procedure for the DCS command signal and the CFR response signal according to one embodiment of the present invention. FIG. 8(*b*) is a timing diagram illustrating an example of a delay frame transmission procedure for the DCS command signal and the CFR response signal according to an alternate embodiment of the present invention. FIG. 8(*c*) is a timing diagram illustrating an example of a delay frame transmission procedure for the DCS command signal and the CFR response signal according to the preferred embodiment of the present invention. It will be apparent to persons skilled in the art that the present invention can operate with all commands that require a response within a period of time. As illustrated in FIG. 3, the DCS signal is transmitted from the local fax 106A to the remote fax 106B. A training sequence is then transmitted by the local fax 106A to train the remote fax 106B. The local fax 106A must receive a response from the remote fax 106B before the limited delay tolerance of the transmission protocol expires to indicate a confirmation to send signal (CFR) or a failure to train signal (FTT). In the preferred embodiment the T.30 protocol is used, therefore, the limited delay tolerance is between 2.55 seconds and 3.45 seconds, as described above. The present embodiment operates under the premise that the local fax 106A will time-out after the lowest possible limited delay value of 2.55 seconds. In alternate embodiments, other limited delay values can be used. After transmitting the DCS, the local fax 106A resets a delay timer that maintains the elapsed time since the DCS transmission. In FIGS. 8(*a*)–8(*c*) this occurs at time 0. In these examples the time of each event is identified relative to time 0. The DCS is received by the local WAN I/F 102A and transmitted to the remote fax via the WAN 104. As described above, the WAN 104 can introduce significant transmission delays, for example if the signal path includes one or more satellite "hops." FIGS. 7(*a*)–7(*c*) illustrate three alternate procedures performed by the delay tolerance unit 204 of the local WAN I/F 102A, FIG. 7(*d*) illustrates the process that is concurrently performed in the local fax 106A.

With reference to FIGS. 7(*a*) and 7(*b*), if the transmitted command signal requires 742 a response signal, the delay tolerance unit initiates 743 a timer after transmitting the command signal. The delay tolerance unit then waits 744 for the response signal. If the response signal is not received by the local WAN I/F 102A before 748 a delay frame waiting period that is less than the limited delay tolerance, e.g., 2.0 seconds, the delay tolerance unit 204 generates 749 and transmits a preamble to the local fax 106A and then generates 750 and transmits a delay frame to the local fax 106A. The first delay frame is then appended to the preamble 402. The delay frame is an optional frame within an HDLC frame. The contents of the delay frame are described below with reference to FIG. 9. After generating 750 and transmitting the delay frame to the local fax, the local WAN I/F 102A determines 754 if a response frame has been received. If the response frame is received by the local WAN I/F 102A, the response frame is aligned, e.g., the local WAN I/F 102A ensures the accuracy of the data in the response frame, and, after alignment, the response frame is transmitted 746 to the local fax 106A after the transmission of a delay frame. The local WAN I/F 102A then resets 752 its timer and the process continues. If a response frame is not received 754 by the local WAN I/F 102A, the present invention can perform a variety of functions. For example, in one embodiment, steps 750 and 754 are repeated until a response frame is received by the local WAN I/F 102A or until a maximum delay period can be established. If the maximum delay period is reached 756 then the local WAN I/F 102A can terminate the connection, for example. In the preferred embodiment, if the maximum delay, e.g., four seconds, is reached 756, the local WAN I/F 102A generates and transmits 757 flags until a response frame is received 754 or until the maximum delay is reached (if the maximum delay is in effect), as illustrated in FIG. 7(*b*).

With reference to FIG. 8(*a*), the local WAN I/F 102A transmits the preamble 802 after approximately 2.0 seconds and then transmits a stream of delay frames 804 as part of the HDLC frame. When a CFR signal is received by the local WAN I/F 102A at approximately 6.5 seconds, the frames within the CFR HDLC frame 806 are appended to the last delay frame and transmitted to the local fax 106A after the CFR HDLC frame is aligned to ensure the integrity of the data. The transmitted preamble 802, delay frames 804, and CFR 806 are a single HDLC frame in one embodiment of the present invention.

With reference to FIG. 8(*c*), the local WAN I/F 102A transmits the preamble 802 after approximately 2.0 seconds and then transmits a delay frame 804 and a stream of flags 805 as part of the HDLC frame. When a CFR signal is received by the local WAN I/F 102A at approximately 6.5 seconds, the frames within the CFR HDLC frame 806 are appended to the last delay frame and transmitted to the local fax 106A after the CFR HDLC frame is aligned to ensure the integrity of the data. The transmitted preamble 802, delay frame 804, flags 805, and CFR 806 are a single HDLC frame in the preferred embodiment of the present invention.

Figure 7A:
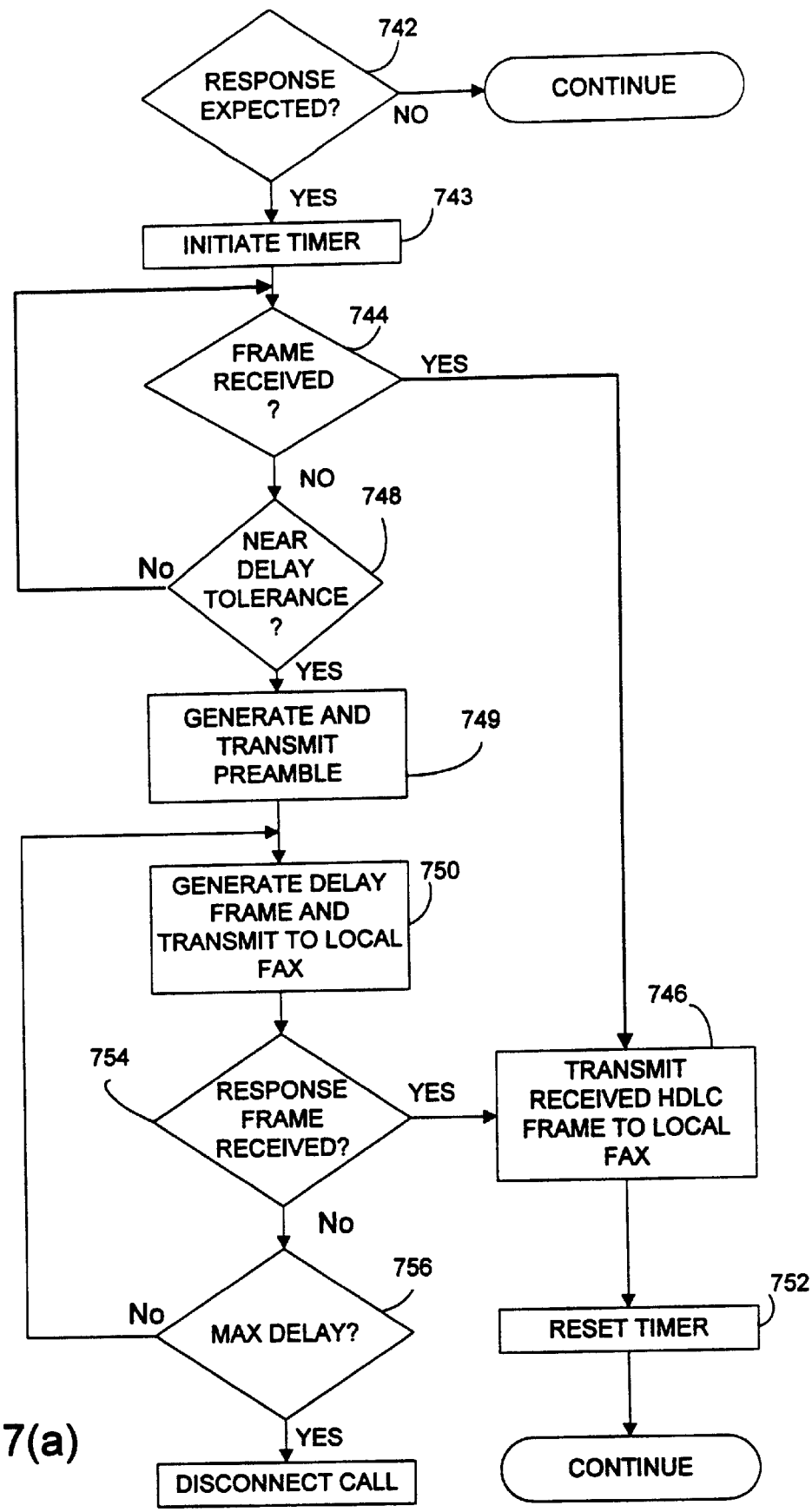
FIGS. 7(a)–7(d) are flowcharts illustrating methods for generating a delay frame and extending a delay tolerance of a facsimile communication system according to a preferred embodiment and an alternate embodiment of the present invention.
Figure 7B:
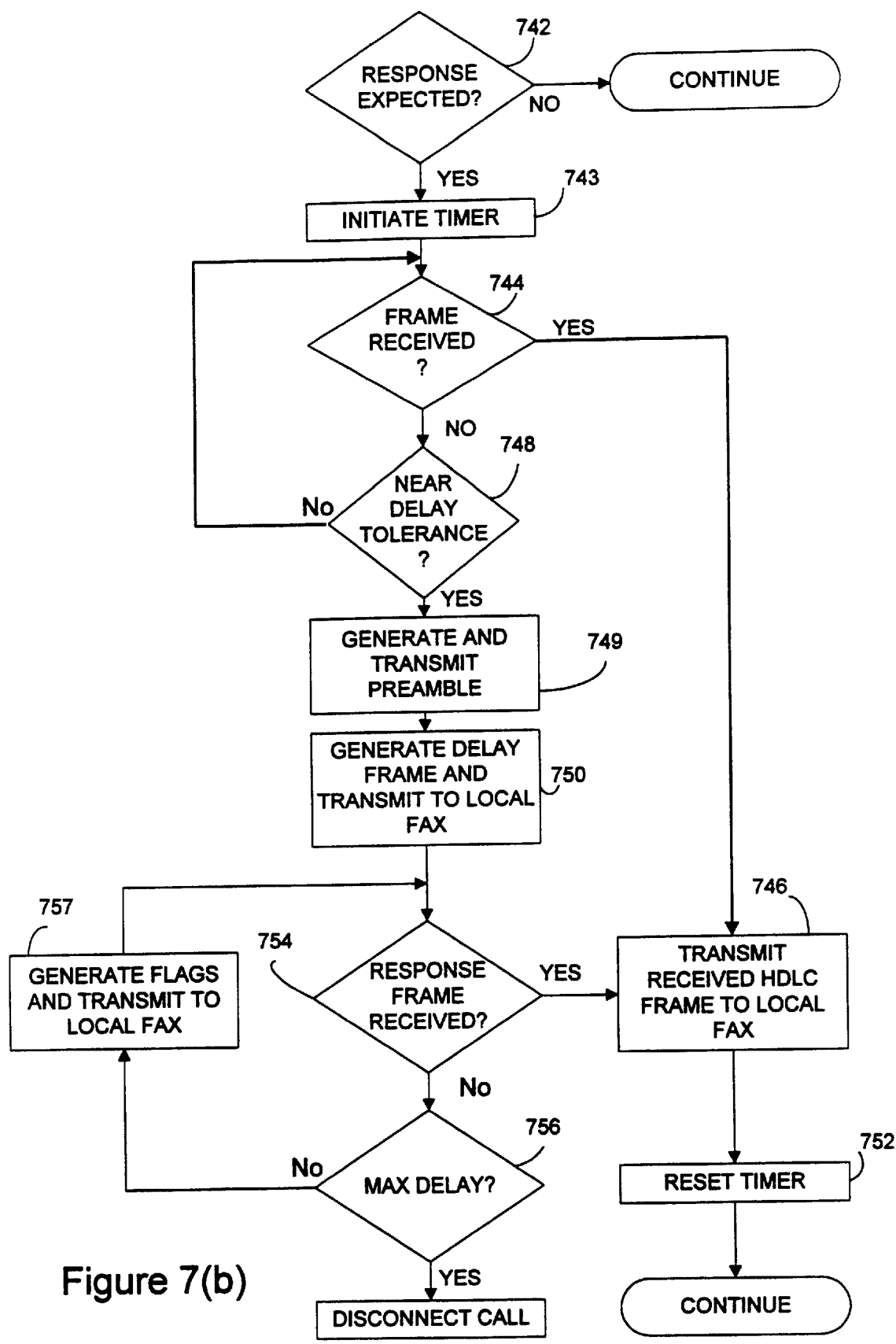
Figure 7C:
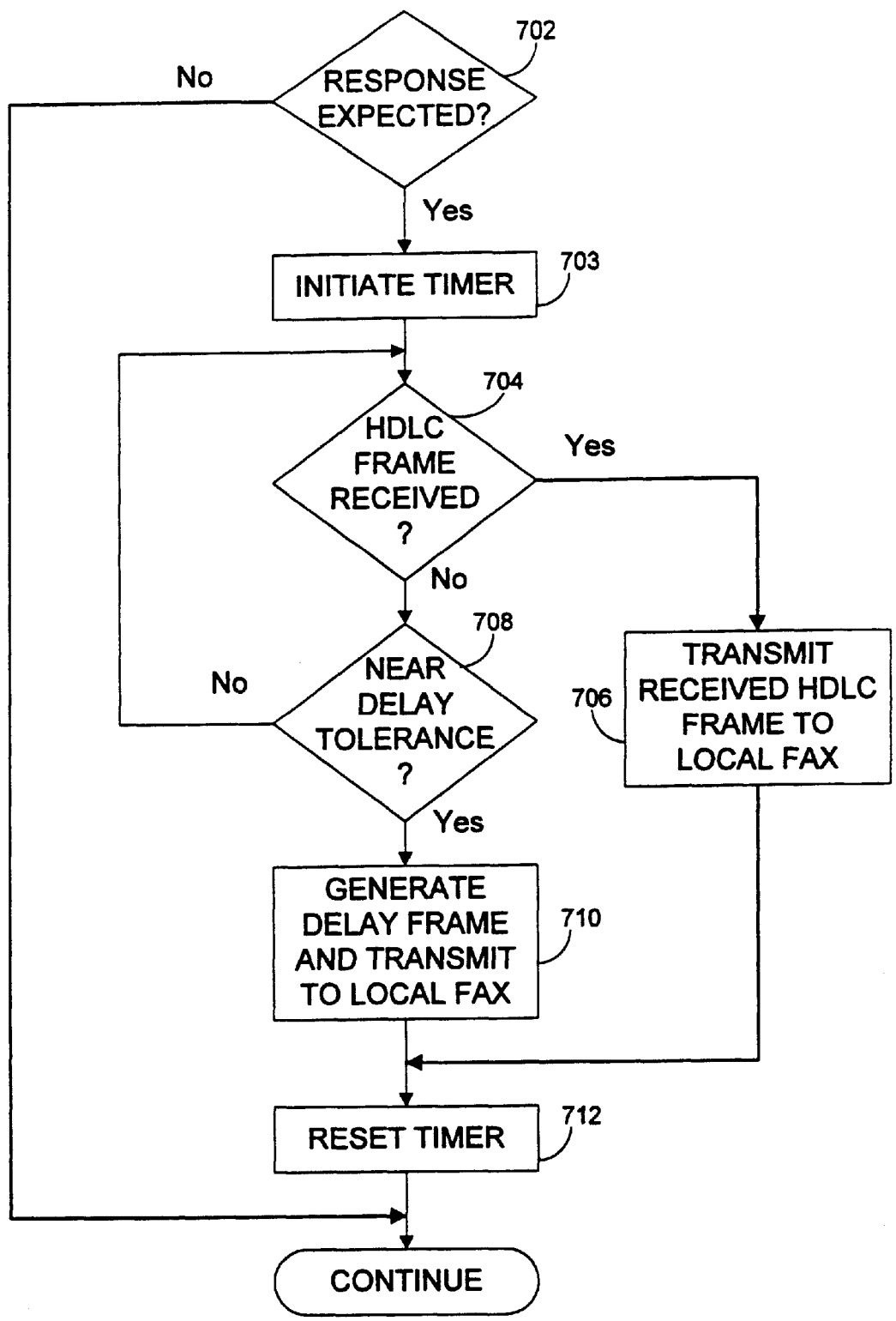
Figure 7D:
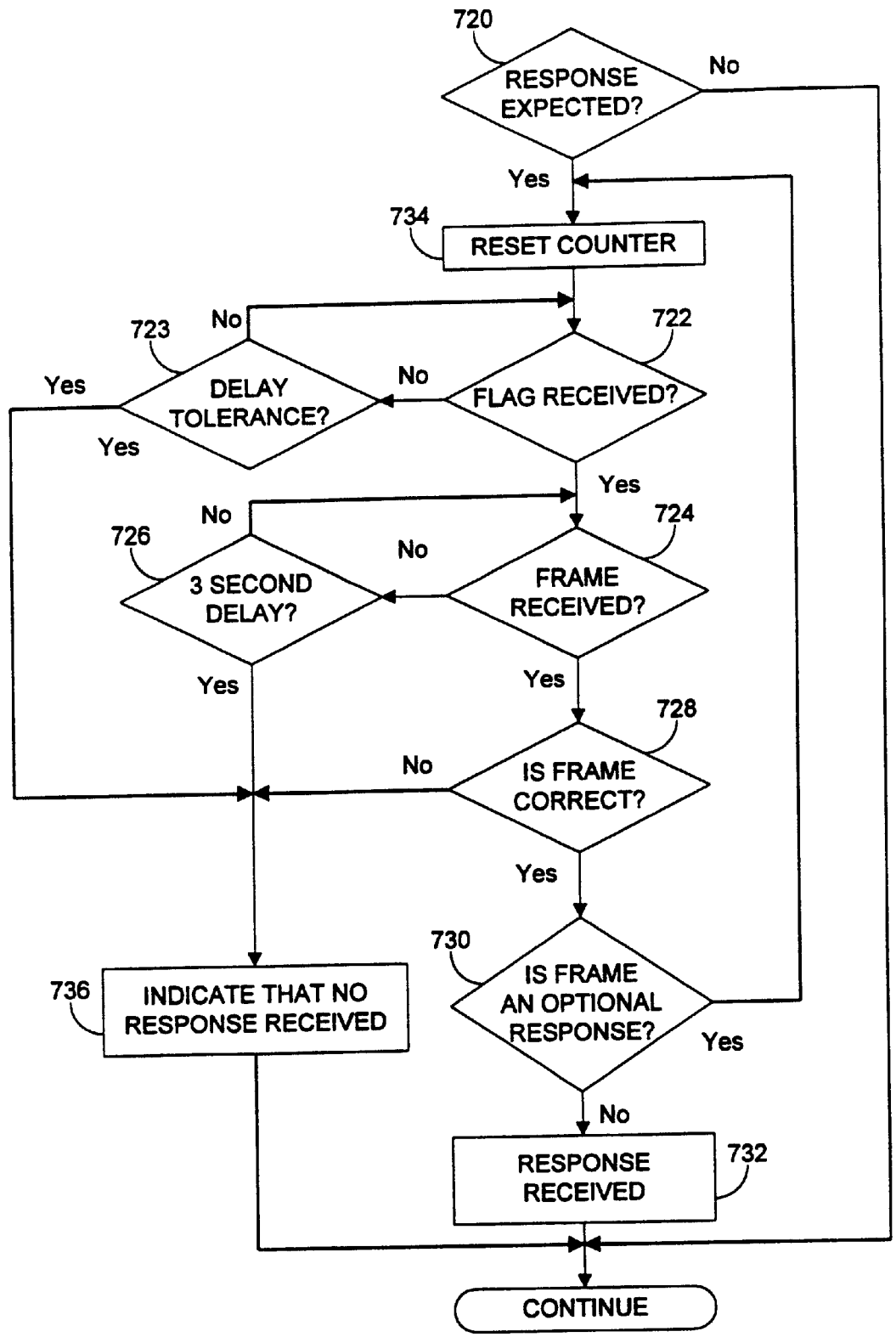
Figure 8A:
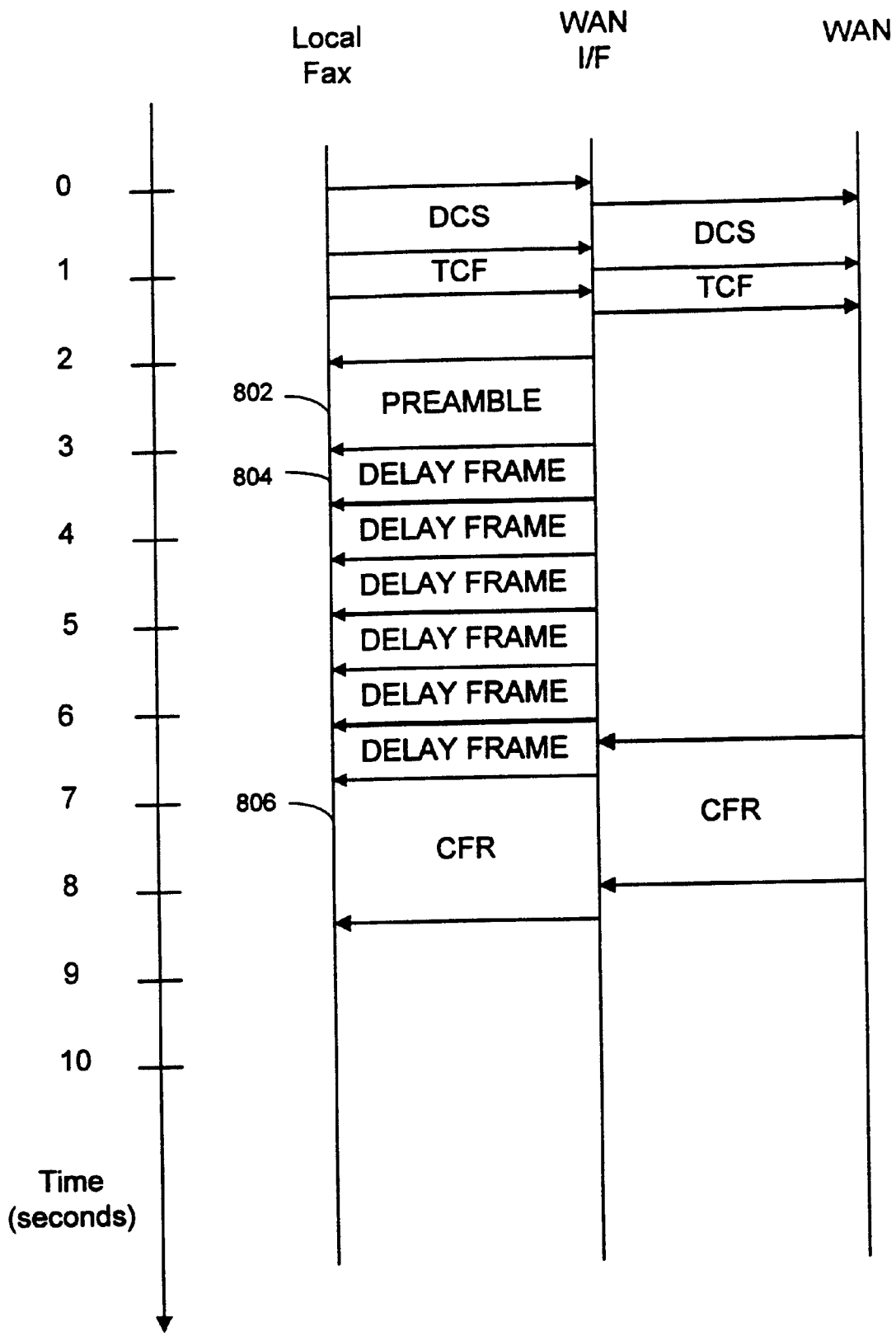
FIGS. 8(a)–8(c) are timing diagrams illustrating three examples of a delay frame transmission procedure according to a preferred embodiment and an alternate embodiment of the present invention.
Figure 8B:
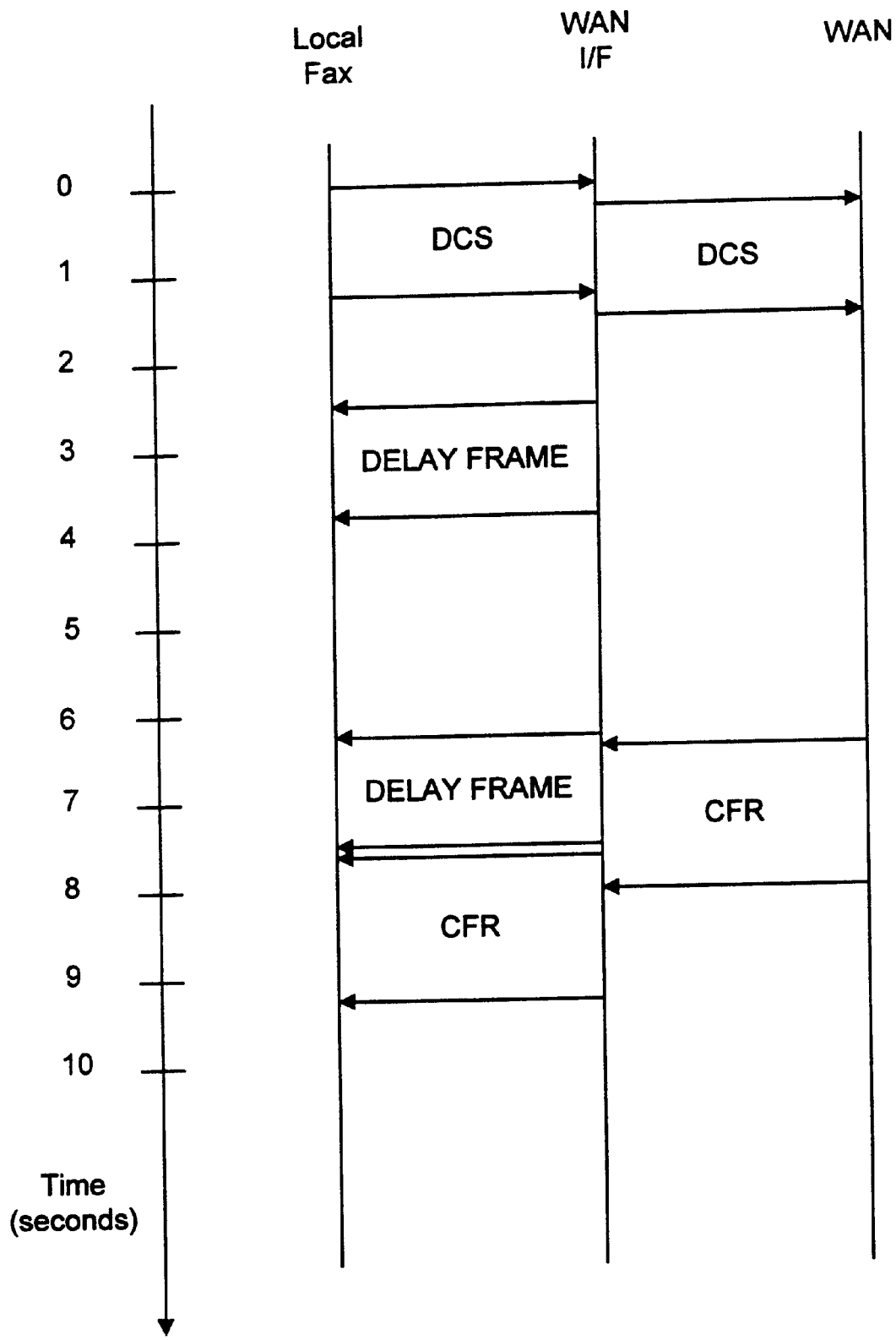

As described above, FIG. 7(*c*) illustrates the method of an alternate embodiment of the present invention. With reference to FIG. 7(*c*), if the transmitted command signal requires 702 a response signal, the delay tolerance unit initiates 703 a timer after transmitting the command signal. The delay tolerance unit then waits 704 for the response signal. If the response signal is not received by the local WAN I/F 102A before 708 a delay frame waiting period that is less than the limited delay tolerance, e.g., 2.5 seconds, the delay tolerance unit 204 generates 710 a delay frame and transmits the delay frame to the local fax 106A. The delay frame is an optional HDLC frame having the required one second preamble 402 and BCI 404. In contrast, the delay frame described used in the preferred embodiment illustrated in FIG. 8(c) and the delay frames illustrated in FIG. 8(a) are sub-frames of an HDLC frame, as described above. The contents of the delay frame are described below with reference to FIG. 9. With reference to FIG. 8(b), the local WAN I/F 102A transmits the delay frame after approximately 2.5 seconds. After the delay frame transmission is complete, e.g., after approximately 3.8 seconds, the delay tolerance unit resets 712 the timer and the process continues.

Figure 8C:
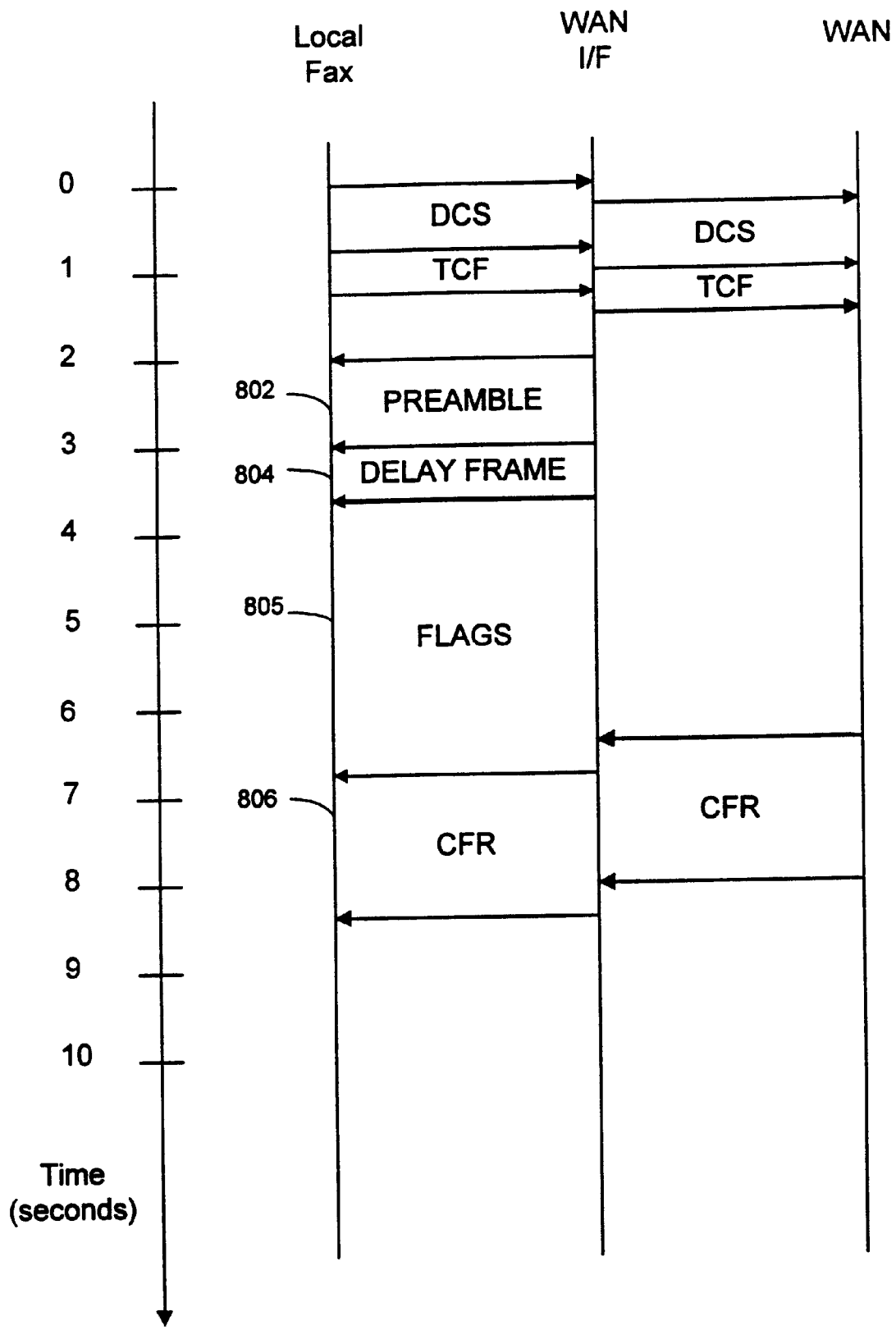
Figure 9:
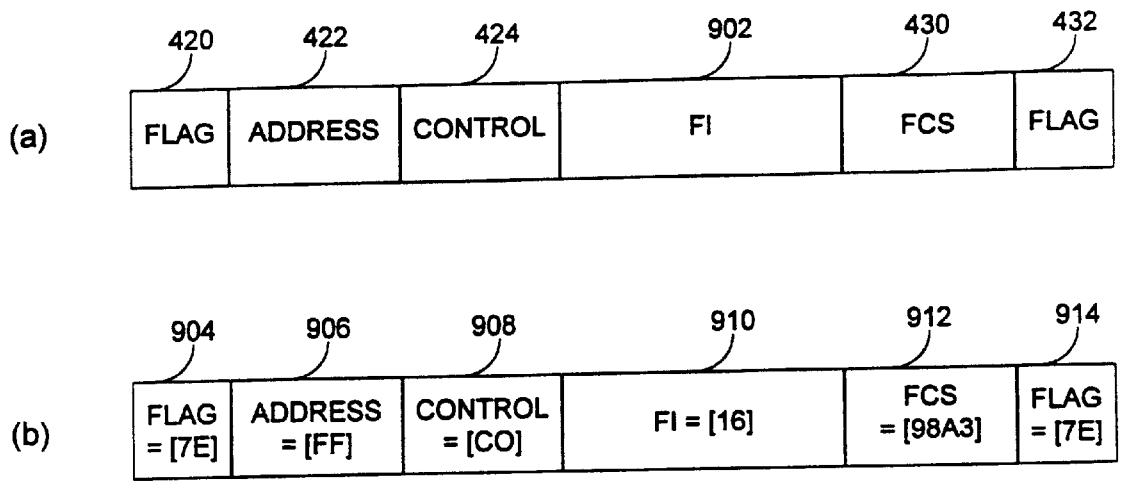
FIGS. 9(a)–9(b) are illustrations of an information portion of a delay frame according to a preferred embodiment of the present invention.

Approximately 2.5 seconds after transmitting the DCS, the local fax 106A receives the delay frame. The procedures invoked by the local fax are illustrated in FIG. 7(d). With respect to FIG. 7(d), if a response is expected 720, the local fax 106A waits until either a flag sequence (7Eh) is received 722 or the limited delay tolerance elapses 723. If the limited delay tolerance elapses 723, the local fax indicates 736 that no response was received and the local fax follows the procedures set forth in the transmission protocol, e.g., the local fax 106A can re-transmit the DCS signal. If a flag is received 722, the local fax 106A waits 726 an additional 3.0 seconds for the remainder of the frame to arrive. Since, in the present invention, the WAN I/F 102A generates an HDLC frame including either at least one delay frame, a stream of flags, and a response frame, or a continuous stream of delay frames and a response frame, or at least one HDLC delay frame, as opposed to only one or more flags as proposed in conventional systems, the complete first delay frame will arrive 724 at approximately 3.8 seconds (depending upon the size of the frame), as illustrated in FIGS. 8(a)–8(c). If the frame is correct 728, for example if the FCS is accurate, the local fax 106A determines 730 if the received delay frame is an optional response. Since the delay frame generated by the local WAN I/F 102A is an optional response signal 730, the local fax 106A resets 734 its timer and the process repeats beginning at step 722 as shown in FIG. 7(d). In the preferred embodiment, a single HDLC frame having at least one delay frame is generated, the size of the HDLC frame continuously expands by the addition of flags, which can be inserted indefinitely if since they occur between frames (sub-frames) of the HDLC frame, or additional delay frames. After receiving the HDLC response frame, e.g., a BCI, from the WAN 104, the local WAN I/F 102A aligns the data and the response frame is appended and is part of the HDLC frame.

In the alternate embodiment described above with reference to FIG. 7(c), a single HDLC delay frame is regenerated and, at approximately 6.3 seconds, i.e., 2.5 seconds after the delay frame was completely transmitted by the local WAN I/F 102A, the delay tolerance unit 204 in the local WAN I/F 102A generates a second delay frame since the CFR signal has not yet been received by the local WAN I/F 102A. The local fax 106A receives the second delay frame during the period between approximately 6.3 seconds and 7.5 seconds. In the example illustrated in FIG. 8(b), the local WAN I/F 102A begins receiving the CFR signal at approximately 6.5 seconds. The local WAN I/F 102A stores the CFR signal in the data buffer 216 until it has completed transmitting the second delay frame to the local fax 106A. Thereafter, the local WAN I/F 102A transmits the CFR signal to the local fax 106A. Although only two delay frames were generated and transmitted in the above example, according to an alternate embodiment of the present invention, it will be apparent to persons skilled in the relevant art that any number of delay frames can be generated and transmitted by the local WAN I/F 102A.

In an alternate embodiment, the WAN I/F 102A monitors the network signal delays in the WAN and modifies the number of delay flags and the delay frame waiting period based upon the determined network signal delays. After receiving 724 the CFR, the local fax 106A determines 728 if the frame is correct and determines 730 that the frame is not an optional response frame. Thereafter, the local fax 106A indicates 732 that a proper response signal was received.

FIGS. 9(a)–9(b) are illustrations of an information portion of a delay frame according to a preferred embodiment of the present invention. The format of the delay frame is the same as other HDLC frames, as described above with reference to FIG. 4. Specifically, the delay frame of the preferred embodiment is part of an HDLC frame that includes a preamble 802, one or more delay frames (sub-frames) 803, and a response frame 804. The delay frame includes one or more flags 420, an address field 422, a control field 424, a facsimile information portion (FI) 902, a FCS 430, and one or more ending flags 432. In contrast in the alternate embodiment of the present invention described above, the delay frame is a complete HDLC and includes a preamble 402 and a BCI 404. The BCI 404 of the delay frame preferably includes only one frame, although additional frames can also be used. The BCI portion of the delay frame includes one or more flags 420, an address field 422, a control field 424, a facsimile information portion (FI) 902, a FCS 430, and one or more ending flags 432. Accordingly, the delay frame (sub-frame) 803 of the preferred embodiment has a similar format as the HDLC delay frame of the alternate embodiment of the present invention. Accordingly, the description of FIGS. 9(a) and 9(b) apply to both of these embodiments of the present invention.

The value of each field in the delay flag is set to values that will be interpreted by the local fax as optional and will not interfere in the typical operation of the fax communication session except to extend the delay tolerance of the faxes 106. The present invention accomplishes this operation by selecting values that will be interpreted by the local fax 106A as an optional response signal, thereby stopping the response timer, but which will be otherwise ignored by the receiving fax 106A. For the T.30 protocol, the BCI portion of the delay frame is illustrated in FIG. 9(b) and includes one or more flags (7Eh) 904, an address field 906 equal to FFh, because the WAN is the GSTN, as stated above. The control field 908 is equal to C0h. The fourth LSB of the control field 908 must be equal to a logical zero when using the T.30 protocol because this bit indicates that it is an optional frame. The FI 910 is equal to 16h which indicates that no information is contained in the FI 910. The FCS is equal to 98A3h based upon a formula for computing the FCS set forth in the T.30 protocol. The frame ends with one or more flags 914.

Figure 10:
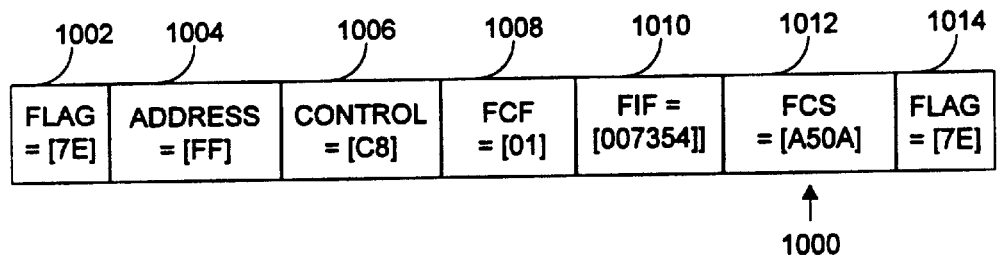
FIG. 10 is an illustration of a DIS frame modified according to the preferred embodiment of the present invention.
Figure 11:
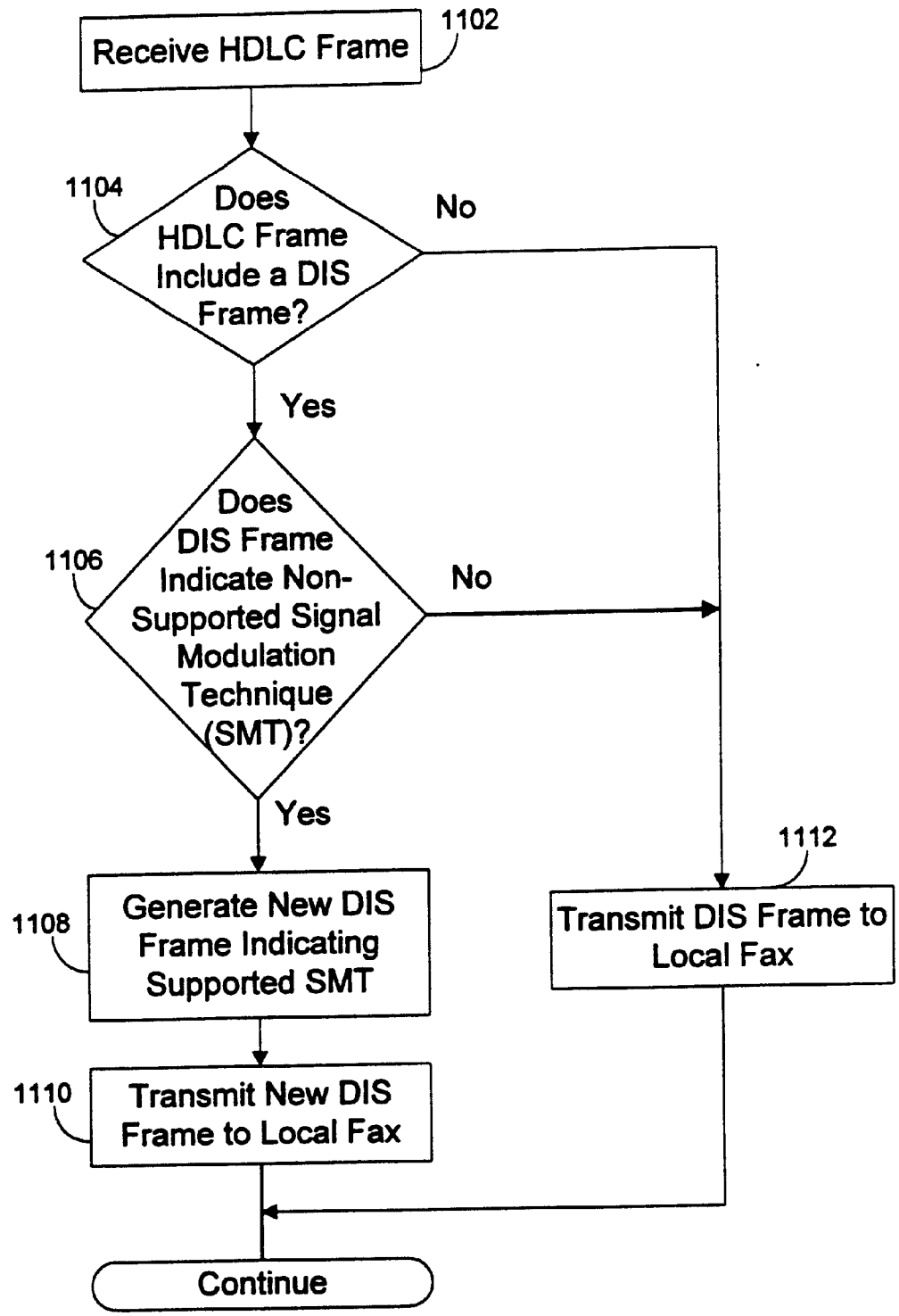
FIG. 11 is a flowchart illustrating a method for modifying an HDLC frame to ensure that facsimile communication uses a supported signal modulation technique according to a preferred embodiment of the present invention.

Another feature of the present invention is that the modulation limitation unit 206 of the WAN I/F 102 ensures that the two faxes 106 communicate using one of a predefined set of signal modulation techniques that is supported by the WAN I/F 102. Some of the functions performed by the modulation limitation unit 206 are now described with reference to FIG. 10 and FIG. 11. FIG. 10 is an illustration a DIS frame 410 in a DIS signal that is modified according to the preferred embodiment of the present invention. FIG. 11 is a flowchart illustrating a method for modifying an HDLC frame to ensure that facsimile communication uses a supported signal modulation technique according to a preferred embodiment of the present invention. In this example, the remote WAN I/F 102B of preferred embodiment checks the DIS frame in the DIS signal to determine if the remote fax 106B supports a V.17 modulation technique. If the remote fax 106B supports the V.17 modulation technique and the remote WAN I/F 102B does not support the V.17 modulation technique, the modulation limitation unit 206 of the remote WAN I/F 102B modifies the DIS frame 410 such that the V.17 modulation technique will not be used during the communication session, for example. The modulation limitation unit 206 receives 1102 an HDLC frame and determines if the HDLC frame includes a DIS frame 410. The DIS frame 410 includes an indication of whether the remote fax 106B supports the V.17 modulation technique. The modulation limitation unit determines 1106 if the remote fax 106B supports the V.17 protocol. Specifically, when using the T.30 protocol, the remote WAN I/F 102B locates two predefined bits in the FIF 428. These bits are equal to "01" if the remote fax supports the V.17 modulation technique, and are equal to "00" otherwise. If the remote fax 106B does not support the V.17 protocol 1106, the remote WAN I/F 102B transmits 1112 the unmodified DIS frame to the local fax 106A, via the local WAN I/F 102A. If the remote fax 106B does support the V.17 protocol 1106, the modulation limitation unit 206 generates 1108 a new DIS frame indicating that the remote fax 106B does not support the V.17 protocol. The remote WAN I/F 102B then transmits 1110 the DIS signal including the modified DIS frame to the local fax 106A, via the WAN 104 and the local WAN I/F 102A. In an alternate embodiment, the modulation unit in the local WAN I/F 102A modifies the DIS frame received from the remote fax 106B and transmits the new DIS frame to the local fax 106A.

One example of a modified DIS frame generated by the modulation limitation unit 206 is illustrated in FIG. 10. The format of the DIS frame 410 is the same as the BCI portion of an HDLC frame, as described above. The modified DIS frame 1000 includes one or more flags 1002. The address field 1004 is equal to FFh because the WAN 104 is the GSTN. The control filed 1006 is equal to C8h, the fourth LSB is equal to a logical one because the DIS frame is the final frame of the DIS signal (HDLC frame), as described above. The FCF 1008 is equal to 01h which identifies the frame as a DIS frame. The FIF is equal to 007354h with the fourteenth most significant bit (MSB) set equal to a logical zero to indicate that the V.17 modulation technique is not supported by the remote fax 106B. In the preferred embodiment, the remote WAN I/F 102B sets the predefined bits equal to "00" and modifies the FCS 1012 accordingly. As described above, even if the remote fax does support the V.17 modulation technique, the present invention spoofs the local fax 106A by modifying the bit identifying the V.17 modulation capabilities. The FCS 1012 is equal to A50Ah and is based upon the FCS protocol of the T.30. The DIS frame 1000 ends with one or more flags 1014.

After receiving either the modified or unmodified DIS signal, the local fax 106B identifies a modulation technique that is supported by both faxes 106. It is possible that both faxes 106 will support a modulation technique that is not supported by the local WAN I/F 102A, e.g., V.17. Accordingly, the local WAN I/F 102A modifies the signal identifying the remote fax capabilities to limit these capabilities to the capabilities of the local WAN I/F 102A. The above example illustrates one example of modifying a DIS frame in a DIS signal to limit the possible modulation techniques. Other features in both the DIS command signal and other command signals can be similarly altered and controlled by the remote WAN I/F 102B or, in alternate embodiments, the local WAN I/F 102A.

The local WAN I/F 102A performs the same functions for the remote fax 106B as the remote WAN I/F 102B performs for the local fax 106A. As described above, the present invention has been described using the T.30 protocol. It will be apparent to persons skilled in the relevant art that the present invention can be utilized with different protocols by adjusting the protocol dependent implementation details described above.

While the present invention has been particularly shown and described with reference to a preferred embodiment, and several alternate embodiments, it will be understood by persons skilled in the relevant art that various changes in form and details can be made therein without departing from the spirit and scope of the invention.

What is claimed is:

1. A method for extending a delay tolerance of a first facsimile station when communicating with a second facsimile station according to a defined protocol, the protocol having a first requirement that the first facsimile station receive a response signal within a first time period after transmitting a command signal the method comprising the steps of:

(1) receiving a command signal from the first facsimile station;

(2) identifying a first time representing the time the command signal was received;

(3) generating a first local response signal, said first local response signal including one or more optional frame signals according to the protocol;

(4) determining a second time within the first time period from said first time; and (5) transmitting said first local response signal to said first facsimile station within the first time period from the first time, if a remote response signal generated by the second facsimile station is not received by said second time, said first local response signal satisfying the first requirement when received by the first facsimile station.

2. The method of claim 1, further comprising the steps of:

(6) identifying a third time representing the time the first local response signal was transmitted;

(7) generating a second local response signal, said second local response signal including one or more optional frame signals according to the protocol;

(8) determining a fourth time within the first time period from said third time; and (9) transmitting said second local response signal to said first facsimile station at said fourth time, if a remote response signal generated by the second facsimile station is not received by said fourth time, said second local response signal satisfying the first requirement when received by the first facsimile station.

3. The method of claim 2, further comprising the steps of:

repeating steps (6) through (9) until receiving said remote response signal; and transmitting said remote response signal to said first facsimile station.

4. The method of claim 1, further comprising the steps of:

(6) generating a second local response signal, said second local response signal including at least one flag;

(7) transmitting said second local response signal to said first facsimile station after transmitting said first local response signal to said first facsimile station to extend the delay tolerance of said first facsimile station.

5. The method of claim 4, further comprising the step of:

(8) repeating steps (6) and (7) until said remote response signal is received; and (9) transmitting said remote response signal to said first facsimile station.

6. The method of claim 4, wherein transmission of said second local response signal occurs immediately after transmission of said first local response signal.

7. An apparatus to facilitate communication between first and second stations according to a defined protocol, the protocol requiring receipt of a response signal within a delay period after transmission of a command signal, the apparatus comprising:

means for receiving, at a first time, a command signal transmitted by one of the first and second stations;

means for determining a second time within the delay period from the first time; and means for transmitting a local response signal to the transmitting one of the first and second stations within the delay period from the first time if a remote response signal is not perceived by the receiving means by the second time.

8. An apparatus to facilitate communication between first and second stations according to a defined protocol, the protocol requiring receipt of a response signal within a delay period after transmission of a command signal, the apparatus comprising:

a receiving unit operable to perceive, at a first time, a command signal transmitted by one of the first and second stations;

a delay tolerance unit coupled to the receiving unit to determine a second time within the delay period from the first time; and a transmitting unit responsive to the delay tolerance unit to transmit a local response signal to the transmitting one of the first and second stations within the delay period from the first time if a remote response signal is not perceived by the receiving unit by the second time.

9. The apparatus of claim 8, wherein the first and second stations comprise facsimile stations; and wherein the protocol comprises a facsimile communications protocol.

10. The apparatus of claim 9, wherein the protocol follows the ITU T.30 recommendation.

11. The apparatus of claim 8, wherein the transmitting unit transmits the local response signal to the transmitting one of the first and second stations approximately at the second time.

12. The apparatus of claim 8, further comprising a response generation unit coupled to the delay tolerance unit and the transmitting unit to generate the local response signal, the local response signal comprising at least one optional frame signal according to the protocol.

13. The apparatus of claim 12, wherein the transmitting unit transmits the local response signal to the transmitting one of the first and second stations at a third time;

wherein the response generation unit generates another local response signal comprising at least one optional frame signal according to the protocol;

wherein the delay tolerance unit determines a fourth time within the first time period from the third time; and wherein said transmitting unit transmits the another local response signal to the transmitting one of the first and second stations within the first time period from the third time if the remote response signal is not perceived by the receiving unit by the fourth time.

14. The apparatus of claim 12, wherein the response generation unit generates another local response signal comprising at least one flag; and wherein said transmitting unit transmits the another local response signal to the transmitting one of the first and second stations after transmitting the local response signal.

15. The apparatus of claim 14, wherein said transmitting unit repeatedly transmits the another local response signal to the transmitting one of the first and second stations until the remote response signal is perceived.

16. The apparatus of claim 14, wherein said transmitting unit transmits the another local response signal immediately after transmission of the local response signal.

17. A communications system, comprising:

a first station; and the apparatus of claim 8 coupled to the first station.

18. A communications system, comprising:

first and second facsimile stations; and the apparatus of claim 9 coupled to the first and second facsimile stations.

* * * * *